April 8, 1952 G. J. GIBSON 2,592,414
METHOD OF PRODUCING HARD-FACED METAL
Filed Nov. 8, 1947
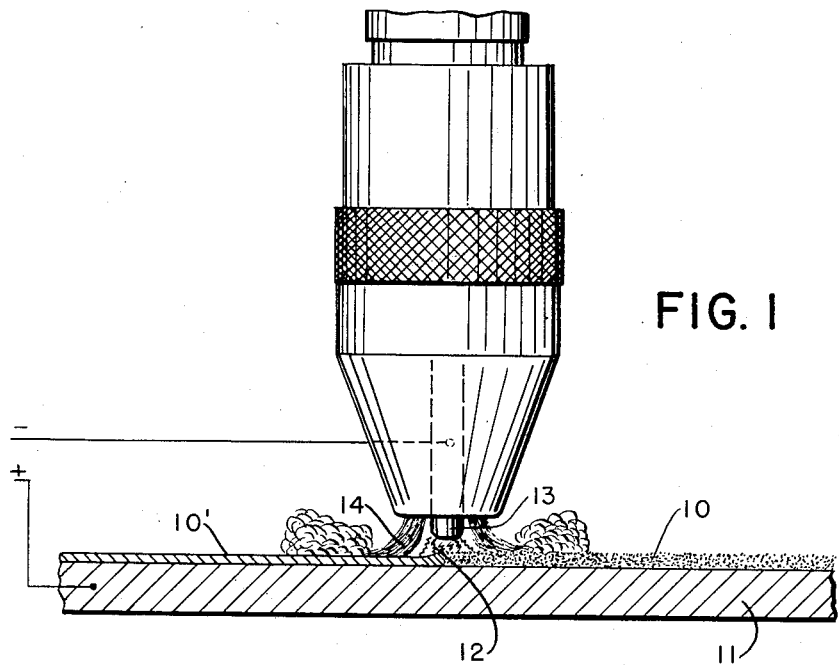
FIG. I
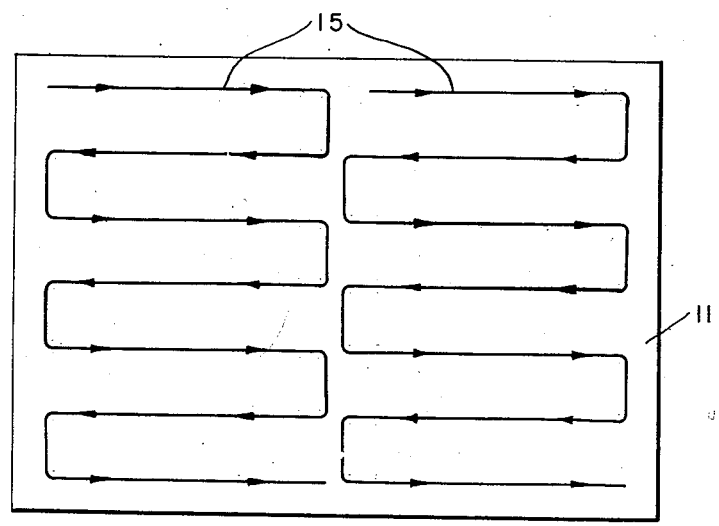
FIG. 2
INVENTOR
GLENN J. GIBSON
BY
ATTORNEYS Patented Apr. 8, 1952

2,592,414

UNITED STATES PATENT OFFICE 2,592,414

METHOD OF PRODUCING HARD-FACED METAL

Glenn J. Gibson, Summit, N. J., assignor to Air Reduction Company, Incorporated, a corporation of New York Application November 8, 1947, Serial No. 784,858

2 Claims. (Cl. 219—10)

This invention relates to the art of hard-faced metals. More particularly, it relates to an improved method of hard facing metals with a difficultly fusible carbide of refractory metal such as tungsten carbide or the like.

It is common practice to provide metals with a hard facing of tungsten carbide, or other metallic carbide, either by incorporating particles of the carbide in a welding electrode of the depositing type and using the electrode to hard face the base metal, or by applying small pieces of carbide to the base metal by means of another metal which constitutes a matrix for the carbide pieces or constitutes a so-called "wetting" metal for them, and which is melted by means by an oxyacetylene flame or electric arc. It has also been proposed to sprinkle finely crushed carbide particles over the metal surface to be faced and then heat the base metal to its melting point to bond the carbide particles. All of these methods produce a hard-faced metal in which the carbide particles are not fused but remain as abrasive bodies substantially in their original form. These methods are therefore suitable for producing a hard-faced metal useful in the manufacture of grinding and drilling tools and instruments where it is desired to make use of the abrasive properties of the carbide particles and where the wearing of the facing to a rougher surface with exposed carbide particles may be an advantage rather than a disadvantage. None of such methods however will produce a metal product consisting of base metal having a hard facing of substantially pure tungsten carbide or the like fused into one continuous uniform and homogeneous layer which is bonded to the base metal without resulting contamination of the carbide to any substantial extent by the metal of the base and which has a smooth abrasive-resistant surface that remains smooth as it wears. Such a metal product is useful, for example, in the manufacture of tools and equipment subject to earth abrasion where an extremely hard abrasive-resistant surface is desirable which will scour to a smooth even surface, but heretofore it has not been possible to make a product of this kind by a simple, practical and dependable method, and it is the principal object of this invention to provide such a method.

The improved method is illustrated in the accompanying drawing, in which:

Figure 1 is a vertical section through a metal work-piece that is being hard-faced by the method of the invention;

Fig. 2 is a plan view of the work-piece illustrating the path which the electric arc, used in performing the method, is caused to follow in the preferred procedure.

Referring first to Fig. 1, the hard facing method according to the preferred form of the invention comprises spreading a layer of granulated or powdered tungsten carbide 10, or other metallic carbide or combination of carbides, on the metal base 11 which is to be hard-faced. The base metal may be steel or any other metal to which the carbide will become bonded when the carbide particles are fused as hereinafter described. Experiments have shown that good results are obtained by using carbide particles which pass a 20-mesh screen and are retained on a 60-mesh screen. The layer of carbide particles may be from $\frac{3}{32}$ of an inch to $\frac{3}{32}$ of an inch deep, depending on the thickness of hard facing required. Then, using an electric arc 12, struck between the carbide particles and a non-consuming tungsten electrode 13, and shielded by an inert gas shield of helium or the like, represented at 14, the work surface is traversed along a pattern similar to that shown at 15 in Fig. 2, or its equivalent. Each pass of the electric arc will fuse an area about $\frac{1}{16}$ of an inch wide so successive traverses should be about $\frac{1}{16}$ of an inch apart. The speed at which the arc is advanced should be such that a puddle of molten carbide is maintained as the arc is progressed over the surface of the carbide. The intense heat of the arc is sufficient to fuse the carbide particles into a contonuous layer which bonds itself to the base metal. The gas shield prevents oxidation during the process. The fact that the metallic carbides, such as tungsten carbide, are conductors, permits the arc to be struck between the carbide particles themselves and the electrode. This has the advantage of localizing the heat and preventing excessive fusion of the base metal, thereby preventing undesired contamination of the carbide with the base metal. Any other method of heating, such as an oxyacetylene flame, would melt the base metal excessively if enough heat could be applied at a high enough temperature to fuse the tungsten carbide. However, in the present method enough heat is supplied to the base metal to cause the layer of fused carbide to bond to the base metal and a metallurgical examination shows a definite alloy bonding layer between the carbide and base metal which is less than 1/10,000 of an inch thick, indicating very little mixing of carbide and base metal.

The finished product is represented by the left-hand portion of the work-piece in Fig. 1 which has been subjected to the treatment of the electric arc, the smooth layer of fused carbide particles on the metal base being represented at 10'.

While in the preferred form of the method the carbide particles are spread on the surface of the base metal in a loose granular form they may, if desired, be spread on the surface in the form of a paste made by mixing the powdered carbide with a suitable liquid or substance that does not interfere with the attainment of the desired results.

It will now be seen that the carbide particles are not bonded in an unmelted condition to the base metal by a metal matrix or "wetting" metal as in certain of the previous hard-facing methods, nor are they bonded to the base metal by any substantial amount of melting of the metal of the base such as usually takes place in previous methods of the kind just mentioned and also in the other method hereinbefore mentioned in which finely crushed carbide particles are sprinkled over the surface to be faced and the base metal is then heated to its melting point to bond the carbide particles. In the latter method the object is still to maintain the carbide particles in their whole unmelted state, but even if some of them melt they are necessarily diluted by the melted base metal. On the contrary, in the method of this invention the carbide particles themselves are fused into a continuous smooth layer by the shielded electric arc from the non-consuming electrode which is struck directly on the carbide particles, the base metal being heated only enough by the melted carbide and by the arc to cause sufficient bond between the carbide facing and the base metal. This produces a product which comprises a base metal having a thin layer of fused metallic carbide bonded to the base metal without oxidation of the carbide and without excessive contamination by the base metal to form a smooth hard abrasion-resistant surface of substantially pure metallic carbide which remains smooth even after being subjected to wear.

Tungsten carbide is the preferred carbide for use in producing the hard facing on the base metal, but other refractory carbides may be used, such as carbides of tantalum, titanium, tungsten, columbium, and boron, or any combination thereof.

I claim:

1. The method of hard facing metal which comprises completely covering the surface of the base metal with a layer of electrically conductive particles of at least one carbide from the group consisting of the carbides of tantalum, titanium, tungsten, columbium and boron, passing an electric current between a non-consuming electrode and the carbide particles and establishing an arc between the electrode and the particles, shielding the arc and the carbide particles melted thereby with an inert gas, and producing relative movement between the gas-shielded arc and the carbide-covered base metal to traverse the arc over the carbide particles and thereby progressively fuse them into a smooth uniform carbide layer bonded to the base metal without substantial oxidation of the carbide or substantial contamination of it by the base metal.

2. The method of hard facing steel or the like which comprises covering the surface of the steel with a layer of electrically conductive particles of tungsten carbide, passing an electric current between a non-consuming electrode and the carbide particles and establishing an arc between the electrode and the particles, shielding the arc and the carbide particles melted thereby with an inert gas, and producing relative movement between the gas-shielded arc and the carbide-covered steel to traverse the arc over the carbide particles and thereby progressively fuse them into a smooth uniform carbide layer bonded to the base metal without substantial oxidation of the tungsten carbide or substantial contamination of it by the base metal.

GLENN J. GIBSON.

REFERENCES CITED

The following references are of record in the file of this patent:

UNITED STATES PATENTS

| Number | Name | Date |
|---|---|---|
| 1,733,241 | Scott | Oct. 29, 1929 |
| 1,784,015 | Lane et al. | Dec. 9, 1930 |
| 1,791,968 | Morgan | Feb. 10, 1931 |
| 2,191,469 | Hopkins | Feb. 27, 1940 |
| 2,274,631 | Meredith | Feb. 24, 1942 |
| 2,435,273 | Hatfield | Feb. 3, 1948 |
| 2,473,601 | Lobosco | June 21, 1949 |